(12) United States Patent
Roth

(10) Patent No.: US 7,275,356 B2
(45) Date of Patent: Oct. 2, 2007

(54) APPARATUS FOR RAISING AND LOWERING THE DECK OF A LAWNMOWER

(76) Inventor: Michael K. Roth, 6512 River Farm Dr., St. Louis, MO (US) 63129

( * ) Notice: Subject to any disclaimer, the term of this patent is extended or adjusted under 35 U.S.C. 154(b) by 0 days.

(21) Appl. No.: 11/067,894

(22) Filed: Mar. 1, 2005

(65) Prior Publication Data
US 2006/0196160 A1 Sep. 7, 2006

(51) Int. Cl.
*A01D 34/00* (2006.01)

(52) U.S. Cl. ...................................... 56/17.1

(58) Field of Classification Search ............... 56/17.2, 56/15.8, DIG. 10; 280/43.13; 180/19.1; 16/18 R
See application file for complete search history.

(56) References Cited

U.S. PATENT DOCUMENTS

| | | | | |
|---|---|---|---|---|
| 4,028,868 A | * | 6/1977 | Zehrung, Jr. ............... | 56/17.2 |
| 4,300,334 A | * | 11/1981 | Hines .......................... | 56/17.4 |
| 4,320,616 A | * | 3/1982 | Marto ......................... | 56/15.3 |
| 5,065,568 A | | 11/1991 | Braun et al. | |
| 5,251,429 A | | 10/1993 | Minato et al. | |
| 6,101,798 A | * | 8/2000 | Thagard et al. .............. | 56/16.8 |
| 6,138,444 A | | 10/2000 | Torras, Sr. | |
| 6,226,966 B1 | | 5/2001 | Eavenson et al. | |
| 6,481,194 B1 | * | 11/2002 | Brewer et al. ............... | 56/17.2 |
| 6,729,116 B1 | | 5/2004 | Graus et al. | |

* cited by examiner

*Primary Examiner*—Árpád Fábián Kovács
(74) *Attorney, Agent, or Firm*—Richard C. Litman

(57) ABSTRACT

A frame and bracket assembly for raising and lowering the deck of lawnmower having swivel wheels. The frame is disposed on and attached to the deck of the mower and is positioned beneath a canopy. A distal end of the frame is attached to the lawn mower body. A proximate end of the frame is supported on a bracket. A removable pin functions to support the frame on the bracket. Plural holes in the bracket allow the pin to be repositioned on the bracket thereby allowing a user to raise or lower the lawn mower deck.

6 Claims, 6 Drawing Sheets

APPARATUS FOR RAISING AND LOWERING THE DECK OF A LAWNMOWER

BACKGROUND OF THE INVENTION

1. Field of the Invention

The present invention generally relates to lawn appliances. More specifically, the present invention is a frame and bracket arrangement for raising and lowering the front of the deck of a lawn mower, which lawn mower is equipped with front swivel wheels.

2. Description of the Related Art

Lawn mowers having front swivel wheels are highly regarded by lawn maintenance personnel and homeowners. The swivel wheels contribute greatly to mower handling and maneuverability. One drawback, however, has been in raising or lowering the deck of the mower when a cutting height adjustment is needed or desired. Heretofore, the raising or lowering procedure has required the removal of multiple pins from the wheels, which pins are often covered with dirt and grease. The pins are thus stuck in their respective holes and are very difficult to remove without a time-consuming cleaning process. The cited related art (see accompanying IDS) is rife with attempts to alleviate the above discussed drawback. However the related art incorporates relatively complicated mechanisms that require a high degree of maintenance. None of the above inventions and patents, taken either singly or in combination, is seen to disclose a bracket assembly for raising and lowering the deck of a lawnmower having front swivel wheels as will be subsequently described and claimed in the instant invention.

SUMMARY OF THE INVENTION

The present invention is a frame and bracket assembly for raising and lowering the front of the deck of a lawnmower having swivel wheels. The frame is disposed and attached to the deck of the mower and positioned beneath a movable canopy. A distal end of the frame is attached to the lawn mower body. A proximate end of the frame is supported on a bracket. A removable pin functions to support the frame on the bracket. Plural holes in the bracket allow the pin to be repositioned on the bracket, thereby permitting a user to raise or lower the lawnmower deck.

Accordingly, the invention presents a frame and bracket assembly that allows a user to efficiently adjust the cutting height of a swivel wheel lawnmower with minimum effort.

The invention provides for improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
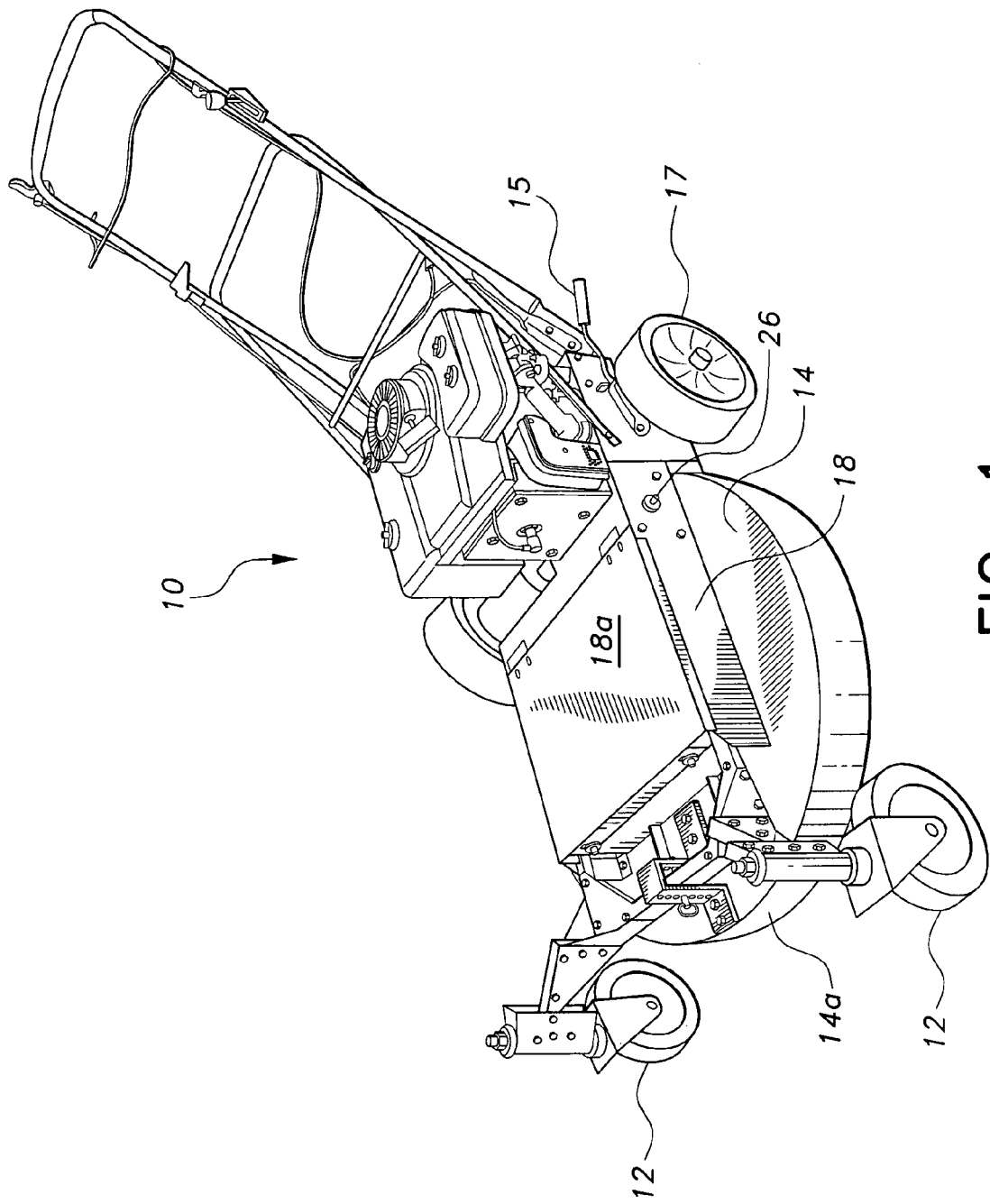
FIG. 1 is an environmental, perspective view of a lawnmower deck raising and lowering apparatus according to the present invention.
Figure 2:
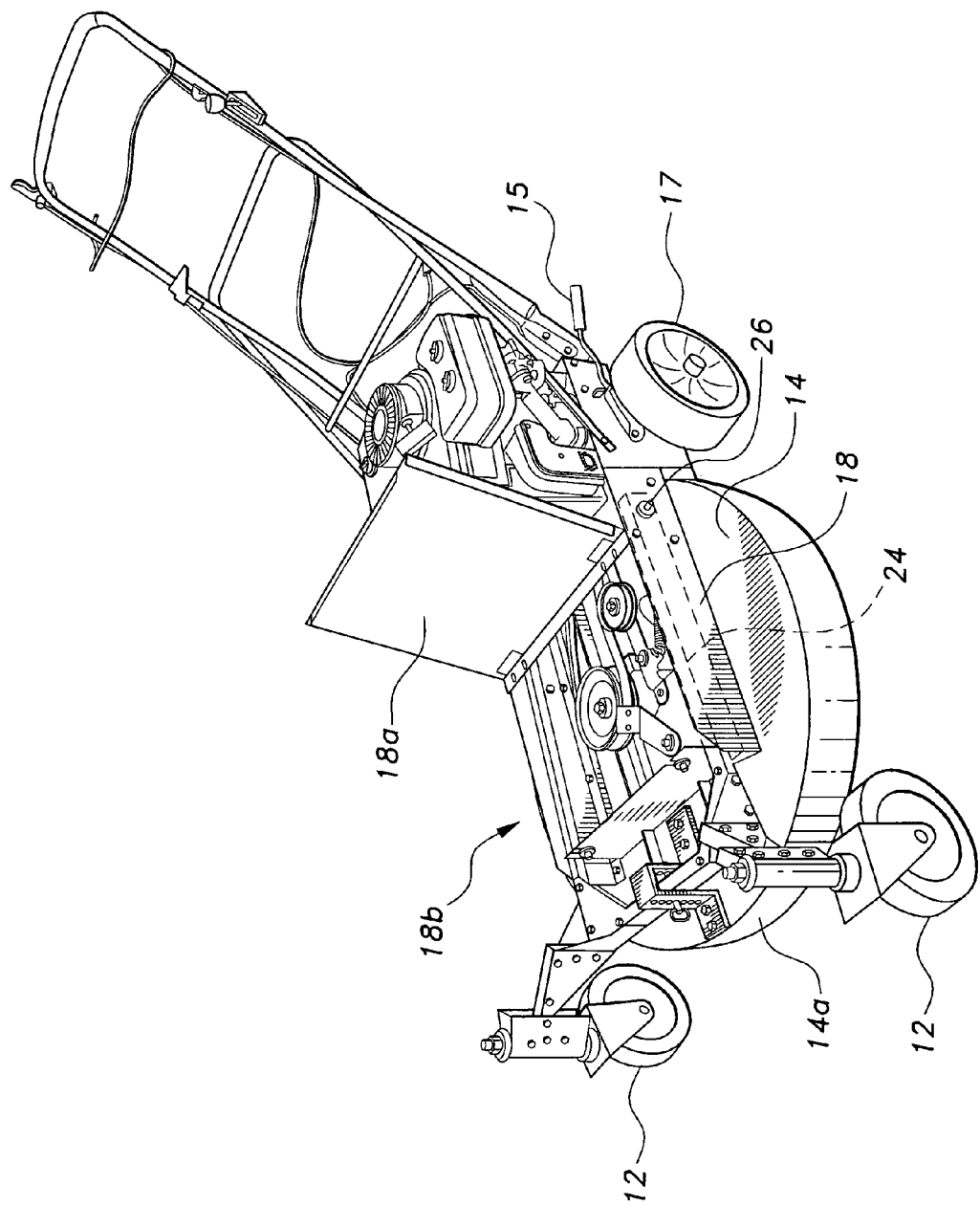
FIG. 2 is a perspective view, with the canopy raised, of a lawnmower deck raising and lowering apparatus according to the present invention.
Figure 3:
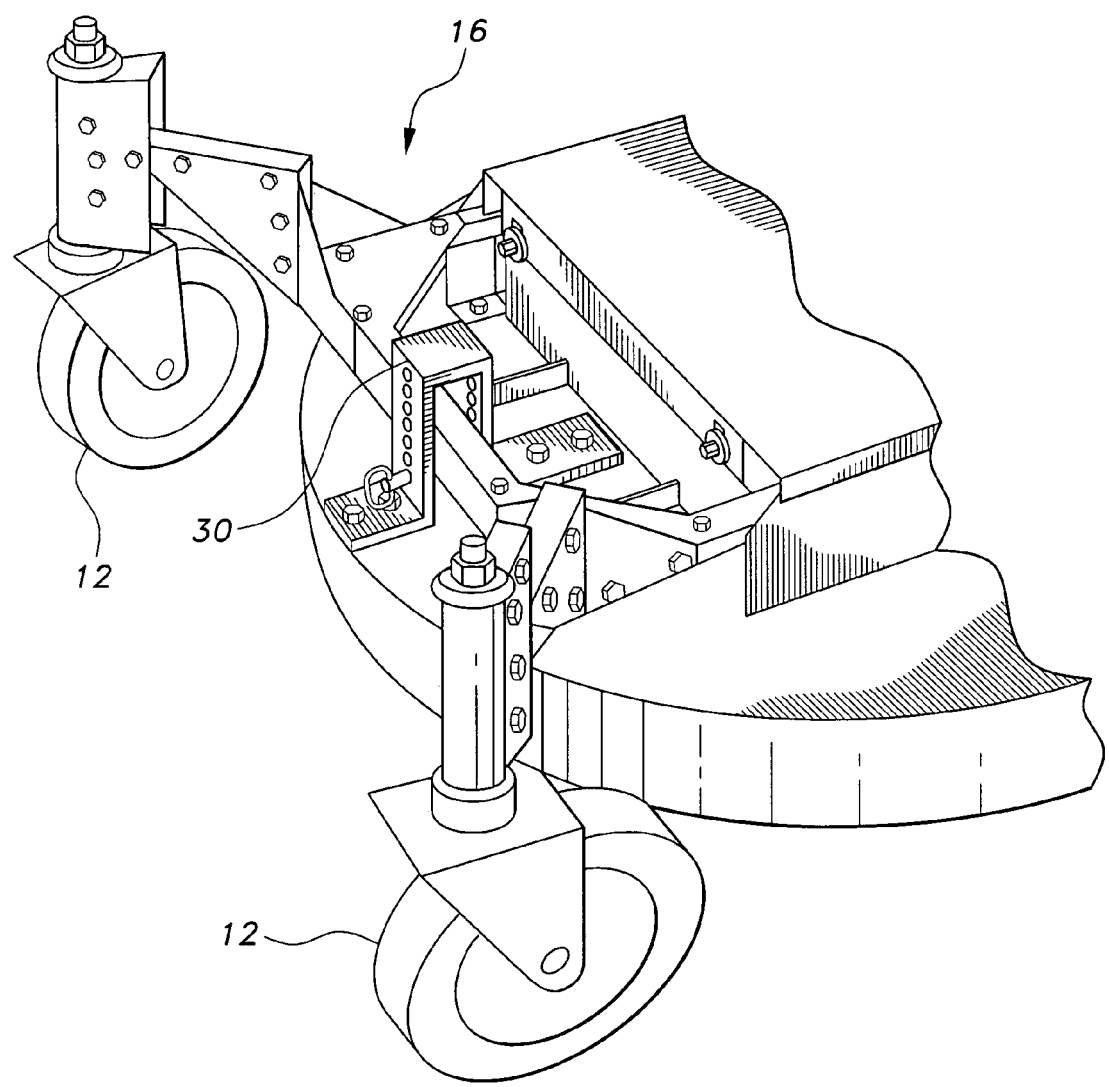
FIG. 3 is a partial, perspective view showing details of the bracket and frame assembly of a lawnmower deck raising and lowering apparatus according to the present invention.
Figure 4:
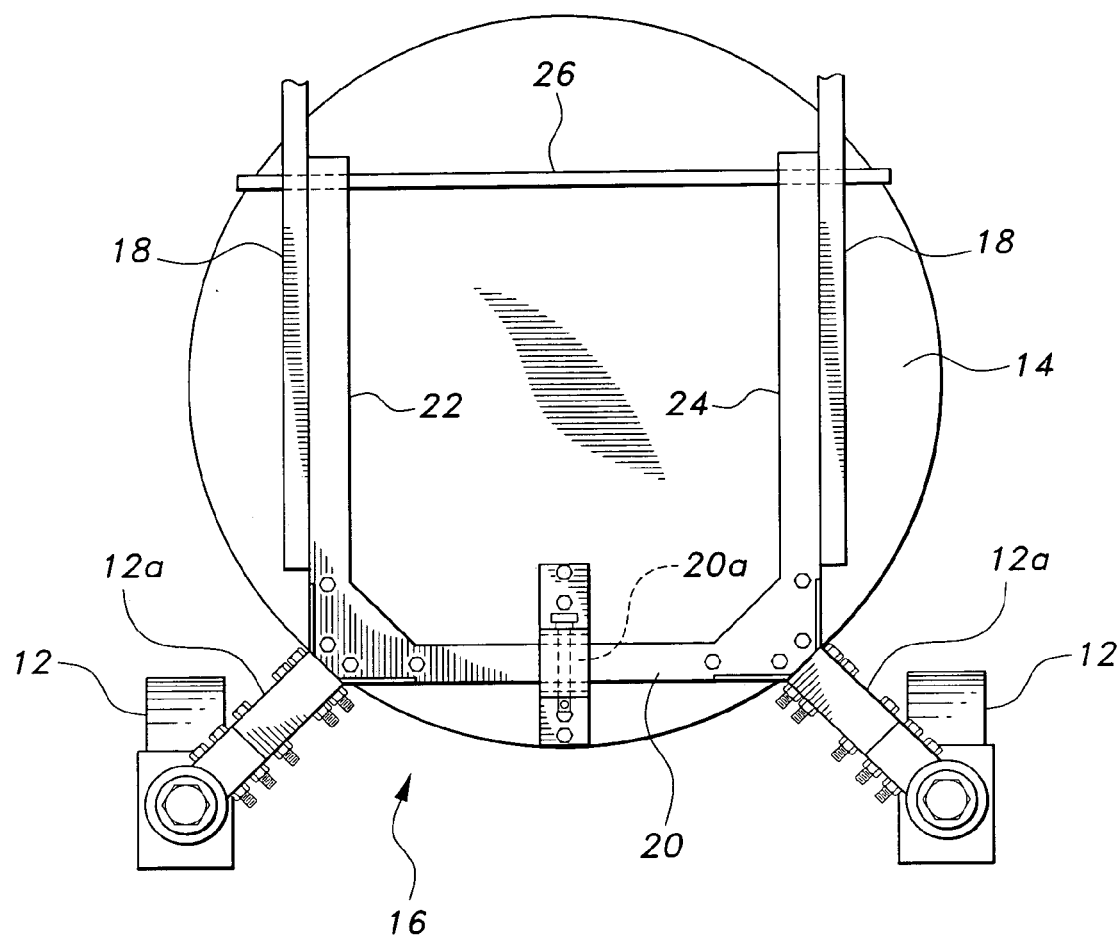
FIG. 4 is a top view of a bracket and frame assembly of a lawnmower deck raising and lowering apparatus according to the present invention.

Attention is first directed to FIGS. 1-3 wherein a lawnmower 10 having swivel front wheels 12 is illustrated. Lawn-mower 10 includes a deck 14, which deck houses a conventional lawn cutting blade (not shown). Deck 14 can be raised and lowered at its front end 14a (and its rear end) to adjust the height of the cutting blade. A frame and bracket assembly, generally indicated at 16 is disposed on the deck to accomplish this function at the front end. A canopy 18 is positioned over a major portion of the frame. As best seen in FIG. 2, a door 18a is pivotally mounted on the canopy to provide access to the mower drive mechanisms 18b for maintenance thereon.

Frame and bracket assembly 16 comprises a front frame member 20 disposed adjacent the front end 14a of deck 14. A respective arm 12a is attached at each end of member 20. A swivel wheel 12 is mounted in each arm 12a. Respective side frame members 22, 24 extend from member 20 and terminate adjacent the rear of deck 14. Side frame members 22, 24 are spaced apart and parallel. A rod 26 spans the space between members 22, 24 and is attached to each member at their respective ends. Rod 26 is attached to the body of the lawnmower. Front frame member 20 is provided with an opening 20a therethrough at a central area for purposes as will be explained below. A bracket 30 is attached to deck 14. Bracket 30 encompasses the opening 20a in front member 20.

Figure 5:
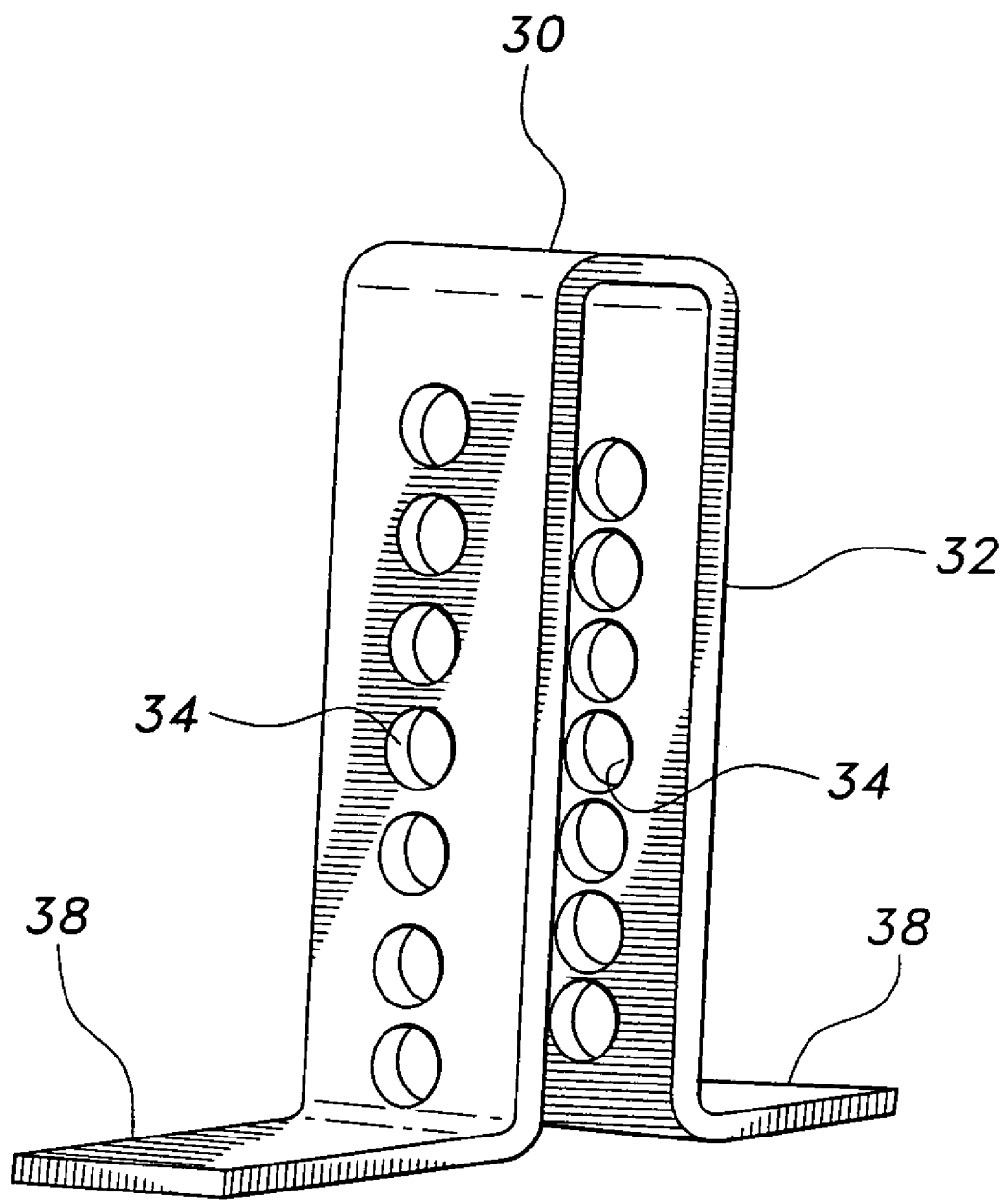
FIG. 5 is a perspective view of a bracket of a lawnmower deck raising and lowering apparatus according to the present invention.
Figure 6:
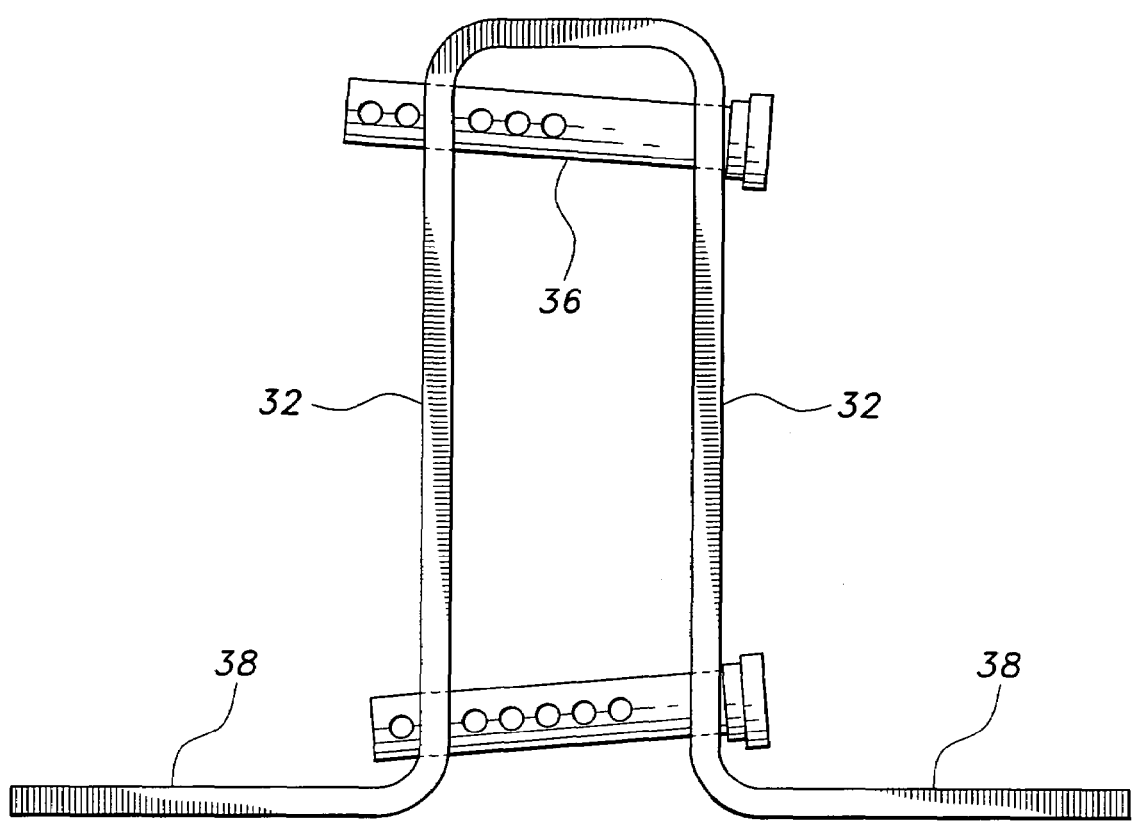
FIG. 6 is a plan view of a bracket of a lawnmower deck raising and lowering apparatus according to the present invention.

As best seen in FIGS. 5 and 6, bracket 30 is a substantially U-shaped member having leg members 32 and foot members 38. A series of vertically spaced openings are disposed in each leg member. The center openings 34 in each leg are coaxial. The other openings in each leg are asymmetrical. A pin 36 is provided for removable mounting in the openings.

Changing the cutting height of the mower is a very simple operation. First lever 15 is manipulated (up or down) to change the height of the rear wheels 17, as is conventional, thus changing the height of the rear end of deck 14. Pin 36 is then removed from bracket 30 and opening 20a in frame member 20. The front of deck 14 can now be adjusted (up or down) to the desired height. Pin 36 may now be reinserted in bracket 30 and frame member 20 to secure the deck at the desired height. A clip is now placed in the pin 36 to prevent it from slipping out. The spacing of the openings in the bracket is asymmetrical pin wont assume a coaxial position in the bracket except in the center position. It is to be understood that the present invention is not limited to the embodiment described above, but encompasses any and all embodiments within the scope of the following claims.

I claim:

1. A lawnmower, comprising:

a deck having an upper surface and a front end;

mower drive mechanisms positioned on said upper surface of said deck;

a frame disposed on said upper surface and attached thereto, wherein said frame includes a front frame member positioned adjacent said front end of said deck, said front frame member having a first end, a second end and an opening through a central area and wherein two side frame members are attached to said front frame member and extend toward a rear end of said deck in parallel relationship;

a canopy positioned on said deck, said canopy having an open top and sidewalls enclosing said mower drive mechanisms and a major portion of said two side frame members;

a door pivotally mounted to said open top of said canopy; and a bracket disposed on said upper surface and attached thereto, said bracket encompassing said opening through said central area of said front frame member for adjusting the height of said front end of said deck.

2. The lawnmower according to claim 1, wherein said bracket is substantially U-shaped having opposed leg members and wherein a series of openings is disposed in each leg member.

3. The lawnmower according to claim 1, wherein said bracket is substantially U-shaped having opposed leg members and wherein a series of vertically spaced openings is disposed in each leg member.

4. The lawnmower according to claim 3 wherein each leg member is provided with one opening that is coaxial with an opening on the opposing leg member.

5. The lawnmower according to claim 4, including a pin adapted for insertion through said opening in said front frame member and through selected openings in said bracket.

6. The lawnmower according to claim 5 including a first swivel wheel attached at said first end of said front frame member and a second swivel wheel attached to said second end of said front frame member.

* * * * *